J. L. KLEINMAN.
BRAKE MECHANISM FOR SEWING MACHINES.
APPLICATION FILED OCT. 5, 1910.
1,021,750.
Patented Mar. 26, 1912.
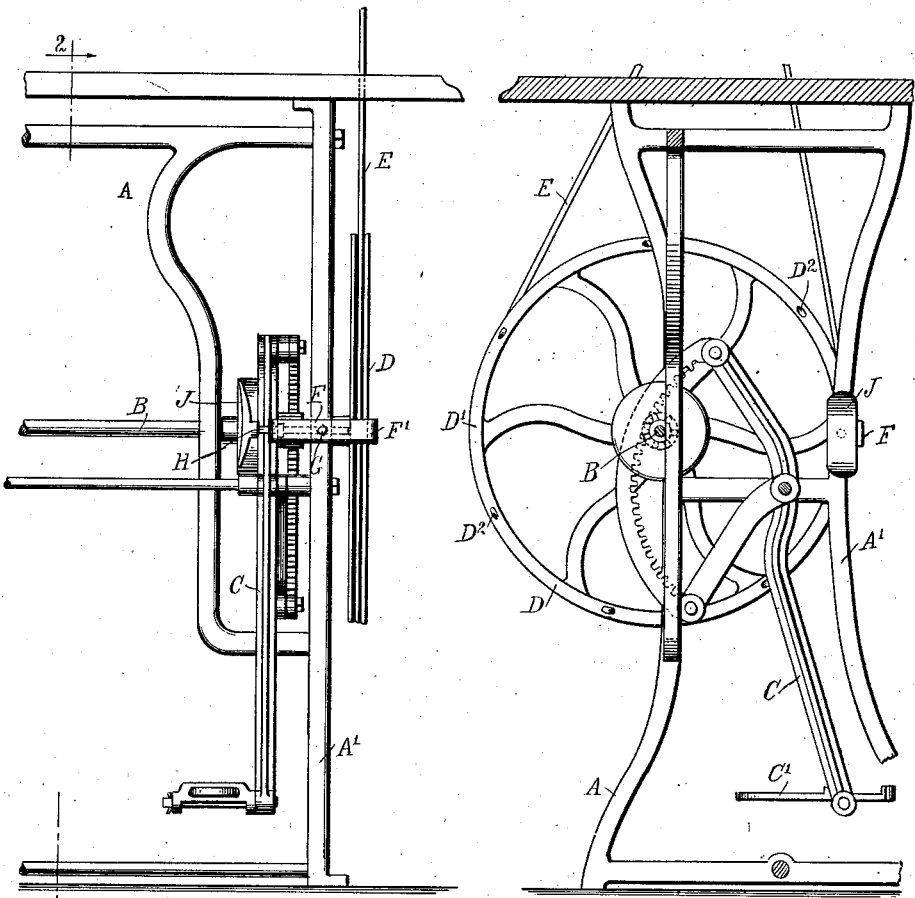
Fig. 1.
Fig. 2.
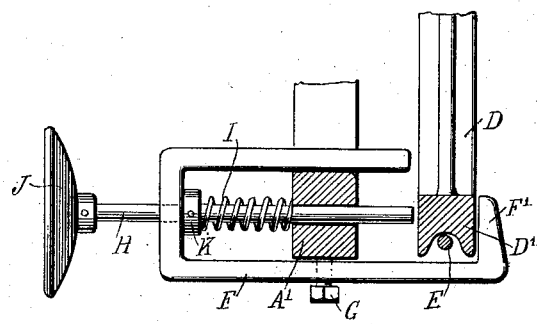
Fig. 3.
WITNESSES
Geo. W. Naylor
INVENTOR
Jacob L. Kleinman
BY
ATTORNEYS

UNITED STATES PATENT OFFICE.

JACOB L. KLEINMAN, OF NEW YORK, N. Y.

BRAKE MECHANISM FOR SEWING-MACHINES.

1,021,750.   Specification of Letters Patent.   Patented Mar. 26, 1912.

Application filed October 5, 1910. Serial No. 585,350.

*To all whom it may concern:*

Be it known that I, JACOB L. KLEINMAN, a subject of the Czar of Russia, and a resident of the city of New York, borough of Manhattan, in the county and State of New York, have invented a new and Improved Brake Mechanism for Sewing-Machines, of which the following is a full, clear, and exact description.

The object of the invention is to provide a new and improved brake mechanism for sewing machines, arranged to permit the operator to readily brake the machine, by a motion of the knee so that the operator can employ the hands for manipulating the work or for other purposes instead of the hands for braking.

For the purpose mentioned use is made of a spring-pressed brake arranged opposite a rotating part of the sewing machine, the brake having a knee piece adapted to be engaged by the operator's knee, to be pressed into contact with the rotating part to brake the sewing machine.

A practical embodiment of the invention is represented in the accompanying drawings forming a part of this specification, in which similar characters of reference indicate corresponding parts in all the views.

Figure 1 is a front elevation of the improved brake mechanism as applied; Fig. 2 is a cross section of the same on the line 2—2 of Fig. 1; and Fig. 3 is an enlarged sectional plan view of the same.

The sewing machine is mounted on a suitably constructed frame A, in which is journaled the pedal shaft B rotated by a suitable pedal mechanism C under the control of the operator, and preferably of the construction of the one shown and described in the application for Letters Patent of the United States, filed by me under even date herewith, Serial So. 585,349. On the pedal shaft B is secured the usual grooved wheel D connected by a belt E with a pulley on the operating shaft (not shown) of the sewing machine. A bearing F is secured by a screw G or other fastening means to the standard A' of the frame A, and the said bearing F is provided with an arm F' extending in close proximity to the outer face of the rim D' of the grooved wheel D, as indicated in Fig. 3. On the bearing F is mounted to slide in a longitudinal direction a brake rod H, having its outer end opposite the arm F' adjacent to the inner face of the rim D' of the wheel D, and the said brake rod H is pressed on by a spring I to normally hold the brake rod H out of engagement with the rim D' of the wheel D. On the inner end of the brake rod H is secured a knee piece J adapted to be engaged by the knee of the operator to press the rod H outwardly so as to move the brake rod H into engagement with the wheel D to force the latter against the arm F' and thus quickly brake the said wheel with a view to bring the operating mechanism of the machine to a standstill. The inner face of the rim D' is preferably provided with spaced recesses $D^2$ adapted to be engaged by a brake rod H, so as to quickly stop the wheel D and hold the same against rotation. The spring I is coiled on the brake rod H and abuts with one end against the standard A' and with the other end presses against a collar K secured to the brake rod H, and which collar is adapted to normally rest on the bearing F so as to limit the inward sliding movement of the brake rod H.

It is understood that the knee piece J is a proper distance above the pedal C' of the pedal mechanism C, so that when the operator is using the sewing machine and the foot rests on the pedal C' then the knee is in close proximity to the knee piece J, and hence the operator by a slight outward pressure of the knee can apply the brake rod H to bring the operating mechanism of the sewing machine to a standstill.

Having thus described my invention, I claim as new and desire to secure by Letters Patent:

1. A brake attachment for sewing machines, comprising a U-shaped bracket having members of unequal length, the longer member being provided with a right angular arm at its end, the bracket being adapted to be secured to the frame of the machine adjacent to a rotating member thereof with the right angular arm opposite the outer face of the said rotating member, and a sliding and spring pressed brake rod mounted in the bracket with one end opposite the arm of the bracket, the other end of the rod being provided with a knee piece rigidly secured thereto.

2. A brake mechanism for sewing machines, comprising a bracket for attachment to the frame of the sewing machine, and having a right angular arm opposite one face of a rotating part of the sewing machine, a brake rod slidable in the said bracket and having one end opposite the said arm on the other side of the rotating part, a spring pressing the said brake rod to normally hold the brake rod out of engagement with the said rotating part, and a knee piece rigidly secured to the said brake rod for engagement by the knee of the operator.

3. The combination with a frame, and a driven wheel mounted therein, the frame having an opening adjacent to the said wheel, of a bracket detachably secured to said frame and having a right angular arm opposite one face of the wheel, a brake rod mounted in the bracket and projecting through the opening in the said frame with one end opposite the arm on the other side of said wheel, a collar on the brake rod, a spring on the said rod between the collar and frame, and a knee piece rigidly secured to the other end of the brake rod.

In testimony whereof I have signed my name to this specification in the presence of two subscribing witnesses.

JACOB L. KLEINMAN.

Witnesses:
 THEO. G. HOSTER,
 PHILLIP D. ROLLHAUS.

Copies of this patent may be obtained for five cents each, by addressing the "Commissioner of Patents, Washington, D. C."